(12) United States Patent
Dyatlov et al.

(10) Patent No.: US 6,759,445 B1
(45) Date of Patent: Jul. 6, 2004

(54) FOAM MATERIAL COMPRISING LINEAR, ISOTACTIC POLYMERS

(75) Inventors: Valery Alexandrovich Dyatlov, Moscow (RU); Bernhard Hanke, Bad Schwalbach (DE); Bernhard Rieger, Ulm (DE); Judith Preuschen, Mainz (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/089,342

(22) PCT Filed: Oct. 2, 2000

(86) PCT No.: PCT/US00/27132

§ 371 (c)(1),
(2), (4) Date: Mar. 27, 2002

(87) PCT Pub. No.: WO01/27191

PCT Pub. Date: Apr. 19, 2001

(30) Foreign Application Priority Data

Oct. 8, 1999 (EP) .............................. 99120171

(51) Int. Cl.$^7$ ................................ C08J 9/00; C08J 9/66
(52) U.S. Cl. ............................. 521/60; 521/64; 521/79; 521/142; 521/143
(58) Field of Search .............................. 521/60, 64, 79, 521/142, 143

(56) References Cited

U.S. PATENT DOCUMENTS 4,542,164 A    9/1985   Nishioka et al.

FOREIGN PATENT DOCUMENTS

WO        WO 95/25757 A1    9/1995

*Primary Examiner*—Morton Foelak
(74) *Attorney, Agent, or Firm*—Angela Marie Stone

(57) ABSTRACT

The present invention relates to form materials comprising polymeric material wherein the structure of the polymeric material contains elastic amorphous areas of nano-scale-size reinforced with self arranged crystalline domains of nano-crystals.

9 Claims, No Drawings

FOAM MATERIAL COMPRISING LINEAR, ISOTACTIC POLYMERS

FIELD OF THE INVENTION

The present invention relates to foam materials used for example in insulation, shock absorption, cushioning, packaging, sealing, lubrication, liquid absorption, liquid conducting, filtration of liquid, heat and gas insulation, providing buoyancy, gas absorption packaging and storage. The invention relates to foam materials with open pores as well as to foam materials with closed pores. Specifically, the present invention relates to elastic foam materials.

BACKGROUND

Foam material and in particular foam materials comprising olefinic polymers are well known in the art and enjoy widespread usage throughout the industry. Typical areas of application of such foam material include hygienic articles and in particular disposable absorbent articles, packaging materials.

Foam materials made from commonly used polyolefins such as PP, PE, PS, PIB have a number of useful properties. They are bio-compatible and food compatible, chemically stabile, inert, non toxic materials. However, most of them have poor mechanical properties including insufficient strength/tear resistance, insufficient stretchability/elasticity and the like.

Several approaches have been proposed in the prior art to provide elastic properties to such foam materials. The most commonly used approach is based on changing the chemical structure of the polymer by introducing hinged joints/ moieties into the main chain of the polymer. These side groups or side chains provide more flexibility to the polymeric backbone preventing crystallization of polymer, lowering the glass transition temperature (Tg) and improving the elasticity of the resulting material. Usually, the hinge groups contain heteroatoms providing flexibility such as oxygen, nitrogen or chlorine placed into the main chain or into bulky side groups. Another approach is mastication of the polymer by blending with special plasticizing agents. Both approaches, however, require heteroatoms to be introduced into the molecule or into the bulk of the coating material.

The third approach proposed in the prior art to provide elastic properties to such foam materials, which is more close to the present invention, is to exploit the formation of hetero-phases which reinforce the bulk material by forming a physical net. To do this the block-co-polymerization of two or more different monomers has been used leading to polymeric backbones comprising blocks with different Tg. This results in micro-phase separation in the bulk with formation of reinforcing crystalline domains of one co-polymer linked with each other by flexible chains of the second co-polymer.

In essence, conventional foam materials carry a wide variety of inherent disadvantages including but not being limited to insufficient strength/tear resistance, insufficient stretchability/elasticity, not being bio-compatible, not being food compatible, comprising heteroatoms such as chlorine and hence leading to toxic residues when burnt, and the like.

It is an object of the present invention to provide foam materials which overcome the disadvantages of the prior art foam materials.

It is an further object of the present invention to provide articles which comprise elastic foam materials.

It is an further object of the present invention to provide a method for manufacturing foam material of the present invention.

It is a further object of the present invention to provide a foam material that can be manufactured with low variability between different batches of material.

SUMMARY OF THE INVENTION

The present invention provides a polymeric foam material. The foam material comprises a polyolefinic homopolymer having an isotacticity of less than 60% [mmmm] pentad concentration.

The present invention further provides a method for manufacturing the polymeric foam material of the present invention comprising a step of processing the polymeric material, said step of processing selected from the group of inert gas expansion, evaporated solvent expansion, reactive reagent gas expansion, high internal phase emulsion, bead expansion, and combinations thereof.

DETAILED DESCRIPTION OF THE INVENTION

The present invention provides foam materials comprising a polyolefinic homopolymer.

The term "polyolefinic homopolymer" as used herein refers to those polyolefins which comprise only one phase of molecules all of which exhibiting a similar stereochemical configuration. For example, blends of atactic and isotactic polymers where the two phases have polymerized simultaneously are excluded when this term is used. The term homopolymer includes copolymers where all molecules exhibit a similar stereochemical configuration.

The polyolefinic homopolymer of the present invention may comprise linear isotactic polymers having a structure of one or several $C_3$ to $C_{20}$ olefinic monomers, having an isotacticity of less than 60%, preferably less than 55%, more preferably less than 50%, and most preferably less than 45% of [mmmm] pentad concentration, and having an isotacticity of more 10%, preferably more than 15%, more preferably more than 20%, and most preferably more than 25% of [mmmm] pentad concentration. Preferably, the polyolefinic homopolymer is polypropylene.

The isotacticity of the homopolymers may be reduced compared to the isotactic polypropylenes of the prior art due to a statistic distribution of stereoscopic errors in the polymer chain. The term "stereoscopic error" refers to a stereoscopic sequence characterized by a [mrrm] pentad. In this case, the central monomer has a stereo configuration opposed to the other four monomers in this pentad. The [mrrm] pentad concentration of this polymer therefore is above the statistical probability of $p^2 (1-p)^2$ where p=[m] and hence 1−p=[r] and $p^4$=[mmmm]. Preferably, the pentad concentration is at least $[p (1-p)]^q p (1-p)$ with q being 0.8, more preferably q being 0.6, yet more preferably q being 0.4, yet more preferably q being 0.2, most preferably q being 0.1.

In some embodiments of the homopolymer and in particular in those embodiments where the crystallinity is reduced by means of single stereo errors, a low content of atactic sequences has proven beneficial to the properties of the foam of the present invention. Preferably, the [rmrm] pentad concentration is below 6%, more preferably below 5%, yet more preferably below 4%, yet more preferably below 3%, most preferably below 2.5%.

In some embodiments of the homopolymer and in particular in those embodiments where the crystallinity is reduced by means of single stereo errors, a low content of syndiotactic sequences has proven beneficial to the properties of the foam of the present invention. Preferably, the [rrrr] pentad concentration is below 6%, more preferably below 5%, yet more preferably below 4%, yet more preferably below 3%, most preferably below 2.5%.

Alternatively, the homopolymer of the present invention may include sequences of atactic and isotactic blocks of polymer. Preferably, the mean molecular weight $M_w$ of the polymer is above 100000 g/mol, more preferably above 200000 g/mol, yet more preferably above 250000 g/mol, yet more preferably more than 300000 g/mol, most preferably more than 350000 g/mol.

The glass temperature $T_g$ is between −50 and +30° C. Preferably the glass temperature is below 10° C., more preferably below 5° C., yet more preferably below 0° C., most preferably below −6° C. The melt temperature of the polymer is obtained after heating the sample 150° C. and subsequently cooling the polymer to −50° C.

Without wishing to be bound by this theory, the polyolefinic polymers exhibit a semi-crystalline structure. The structure contains elastic amorphous areas of nano-scale-size reinforced with self arranged crystalline domains of nano-crystals. The formation of brittle macro-crystalline material from the polymer is achieved by introducing the defects into the polymeric backbone. Isolated monomer units with opposite stereo configuration have been used as the defects, i.e. single stereo errors.

Suitable polymers and a process for manufacturing such polymers are described in PCT patent application EP99/02379 incorporated herein by reference. A catalyst combination suitable for the preparation of such polymers is described in PCT patent application EP99/02378 incorporated herein by reference. Preferably, the process of PCT patent application EP99/02378 is carried out by temperatures of less than 30° C., more preferably less than 25° C., yet more preferably less than 20° C., most preferably less than 15° C. to increase the molecular weight of the resulting polymer. In order to increase the molecular weight, the polymerization is preferably carried out in liquid monomer such as in liquid propene. In order to increase the molecular weight, the catalyst is preferably used in combination with the boron activators mentioned in PCT patent application EP99/02378.

Other suitable polymers and a process for manufacturing such polymers is described in WO99/20664 incorporated herein by reference.

It is preferred to use homopolymers for the foams of the present invention since during manufacture of homopolymers the batch to batch variability is greatly reduced in comparison to multi phase polymers where the phases are polymerized in a single reaction.

Preferably, the polymers used in manufacturing the foam materials of the present invention have a distinctive rubber-elastic plateau in their stress-strain curves.

The polymers used for the foam of the present invention are bio-compatible may be burnt without toxic residues since they contain no heteroatoms such as chlorine. The further do not contain toxic monomer residues.

The foam materials of the present invention may have open pores or may have closed pores. High pressure gas foaming yields open pore foams while low pressure foaming yields closed cell foams.

The foam materials of the present invention have been found to be able exhibit superior softness. Preferably, the foam material has a Shore hardness on the A scale of less than 30, more preferably, of less than 25, yet more preferably of less than 20, yet more preferably of less than 15, most preferably of less than 10. The softness of the foam material of the present invention can be increased by manufacturing the foam by low density foaming and by reducing the isotacticity ([mmmm] pentad concentration).

The foam material has been found to exhibit increased temperature stability compared to prior art foam materials. This is partly due to the fact that for the foams of the present invention a homopolymer is used and is partly due to the high molecular weight of the homopolymer. Preferably, the foam material of the present invention has a melting point of at least 100° C., more preferably of at least 110° C., more preferably of at least 120° C., most preferably of at least 130° C. The melt temperature of the polymer is obtained after heating the sample 150° C. and subsequently cooling the polymer to −50° C. Higher melting point may be achieved by blending the homopolymer for example with conventional isotactic polymer such as polypropylene.

The foam of the present invention has been found to be stretchable as well as elastic. The stretchability of the foam versus its elastic behavior can be adjusted by means of the tacticity of the homopolymer of the present invention. The foam material of the present invention has been found to be stretchable without tearing to at least 500% of its original length, more preferably 1000% of its original length, yet more preferably to at least 1500% of its original length, most preferably to at least 2000% of its original length. In addition, the foam material of the present invention preferably recovers within 10 minutes after being stretched and held for 1 minute to 500% of its original length back to less than 300% its original length, preferably less than 200% its original length, most preferably less than 150% of its original length. In addition, the foam of the present invention has been found to exhibit a low compressive set. The foam of the present invention recovers within 10 minutes after a compression to 50% of its original thickness for 1 minute to at least 60% of its original thickness, more preferably at least 70% of its original thickness, yet more preferably to at least 80% of its original thickness, yet more preferably to at least 90% of its original thickness, most preferably to at least 95% of its original thickness. The compressibility of the foam of the present invention can be adjusted by increasing the tacticity of the homopolymer or by blending the low tacticity homopolymer with conventional isotactic polymer such as polypropylene.

The foam of the present invention has been found to exhibit a relative low tackiness at room temperature due to the high molecular weight of the polymer.

Various additives may be added to the homopolymer of the present invention to change the properties of the polymer such as is well known in the art.

Optionally, additives such as surfactants may be used to change the surface properties of the foam of the present invention.

In the prior art, a wide variety of suitable techniques to manufacture foam materials are known including but not being limited to inert gas expansion, evaporated solvent expansion, reactive reagent gas expansion, high internal phase emulsion, bead expansion, and combinations thereof. The aforementioned methods for manufacturing foam materials all have specific advantages which are known to the skilled person. Hence, the skilled person will be able to select a suitable method for manufacturing the foam material of the present invention depending on the specific requirement of the respective application of the foam material. Suitable gases or evaporated solvents for expanding the foams of the present invention include but are not limited to $CO_2$, $N_2$, propene, pentane, and the like. It has been found that due to the low tacticity of the polymer, the processability of the polymer during manufacture of the foam has been greatly improved.

The foam material according to the present invention may also be used as a construction element in an article. Thereby, the functionalities of the foam material include but is not limited to heat insulation, electric insulation, shock absorption, cushioning, acoustic wave damping, protecting other elements of the article, sealing, packaging, storing, providing buoyancy, and the like. Such articles include but are not limited to toys, furniture, mattresses, carpets, clothing, shoes, sport equipment, complex constructions such as buildings (floor coverings, house wraps, and the like), cars, household appliances, and the like. Having regard to the specific advantages of the polymers used for the articles of the present invention, it will be readily apparent to the skilled practitioner to apply and to optionally modify the foam materials according to the present invention as construction elements in the above and similar articles. It is particularly preferred to combine the foam material with a conventional polypropylene material to form the article. In this case, recycling of the material does not require separation of the different materials.

The foam material of the present invention may be oil absorbent and may be rendered water absorbent by suitable surface energy modifiers. Suitable surface energy modifiers are well known in the art. In case the foam material of the present invention is absorbent, the foam material may used in instances including but not being limited to oil absorption, solvent absorption, spill absorption, liquid distribution, liquid transportation, and the like. To improve the absorbency of the foam of the present invention, various additives such as those known in the art may be added to the external and internal surfaces of the foam of the present invention. The foam material of the present invention may further be used to deliver absorbed liquids such as for example adhesive, shoe polish, ink, lubricants and the like upon compression of the foam material.

What is claimed is:

1. A polymeric foam material characterized in that said polymeric foam material comprises a polyolefinic homopolymer having one phase of molecules all of which exhibit a similar stereochemical configuration and having an isotacticity of less than 60% of pentad concentration, a pentad concentration below 3% and a pentad concentration below 6%.

2. A polymeric foam material according to claim 1 wherein the homopolymer has a mean molecular weight of at least 100000 g/mol.

3. A polymeric foam material according to claim 1 wherein said polymeric foam material is stretchable.

4. A polymeric foam material according to claim 2 wherein said foam material is elastically expandable.

5. A foam material according to claim 1 wherein said foam material is oil absorbent.

6. A foam material according to claim 1 wherein said foam material is water absorbent.

7. A polymeric foam material according to claim 1 wherein said polyolefinic polymer is polypropylene.

8. An article comprising the foam material according to claim 1 wherein said article comprises said foam material as a construction element.

9. A method for manufacturing a polymeric foam material comprising a step of processing a polymeric material, said step of processing selected from the group of inert gas expansion, evaporated solvent expansion, reactive reagent gas expansion, high internal phase emulsion, bead expansion, and combinations thereof, characterized in that said polymeric material comprises a polyolefinic homopolymer having one phase of molecules all of which exhibit a similar stereochemical configuration and having an isotacticity of less than 60% of pentad concentration, a pentad concentration below 3%, and a pentad concentration below 6%.

* * * * *

UNITED STATES PATENT AND TRADEMARK OFFICE
CERTIFICATE OF CORRECTION

PATENT NO. : 6,759,445 B1
DATED : July 6, 2004
INVENTOR(S) : Dyatlov et al.

It is certified that error appears in the above-identified patent and that said Letters Patent is hereby corrected as shown below:

Title page,
Item [57], ABSTRACT, the word "form" should be deleted and the word -- foam -- should be inserted therefor.

Column 6,
Lines 8 and 36, -- [mmmm] -- should be added preceding the word "pentad"
Lines 9 and 36, -- [rmrm] -- should be added preceding the word "pentad"
Lines 9 and 37, -- [rrrr] -- should be added preceding the word "pentad"

Signed and Sealed this

Nineteenth Day of April, 2005

JON W. DUDAS
*Director of the United States Patent and Trademark Office*